United States Patent
Hann et al.

(10) Patent No.: US 12,450,001 B2
(45) Date of Patent: Oct. 21, 2025

(54) TECHNIQUES FOR QUANTUM MEMORY ADDRESSING AND RELATED SYSTEMS AND METHODS

(71) Applicant: Yale University, New Haven, CT (US)

(72) Inventors: Connor Hann, New Haven, CT (US); Changling Zou, New Haven, CT (US); Yiwen Chu, New Haven, CT (US); Yaxing Zhang, New Haven, CT (US); Robert J. Schoelkopf, III, Madison, CT (US); Steven M. Girvin, Hamden, CT (US); Liang Jiang, Guilford, CT (US)

(73) Assignee: Yale University, New Haven, CT (US)

( * ) Notice: Subject to any disclaimer, the term of this patent is extended or adjusted under 35 U.S.C. 154(b) by 977 days.

(21) Appl. No.: 17/435,167

(22) PCT Filed: Feb. 28, 2020

(86) PCT No.: PCT/US2020/020366
§ 371 (c)(1),
(2) Date: Aug. 31, 2021

(87) PCT Pub. No.: WO2020/180672
PCT Pub. Date: Sep. 10, 2020

(65) Prior Publication Data
US 2022/0147266 A1    May 12, 2022

Related U.S. Application Data

(60) Provisional application No. 62/812,533, filed on Mar. 1, 2019.

(51) Int. Cl.
*G06F 3/06*    (2006.01)
*G06N 10/20*    (2022.01)
(Continued)

(52) U.S. Cl.
CPC .......... *G06F 3/0655* (2013.01); *G06F 3/0604* (2013.01); *G06F 3/0679* (2013.01);
(Continued)

(58) Field of Classification Search
None
See application file for complete search history.

(56) References Cited

U.S. PATENT DOCUMENTS 9,858,531 B1   1/2018   Monroe et al.
11,189,435 B2 *   11/2021   Adiga .................... H10N 60/01
(Continued)

FOREIGN PATENT DOCUMENTS

WO   WO 2017/151200 A1   9/2017
WO   WO 2020/180672 A1   9/2020

OTHER PUBLICATIONS

Arunachalam, Srinivasan, et al. "On the robustness of bucket brigade quantum RAM." New Journal of Physics 17.12 (2015): 123010. (Year: 2015).*
(Continued)

*Primary Examiner* — Hal Schnee
(74) *Attorney, Agent, or Firm* — Wolf, Greenfield & Sacks, P.C.

(57) ABSTRACT

Techniques for implementing a QRAM by routing quantum information through multiple modes of a bosonic system are described. According to some aspects, a single bosonic system may be configured to maintain quantum information in a large number of independent modes at the same time. Suitable operations upon these modes may allow a quantum address value to be routed to modes associated with respective bits such that the only modes altered by the operations are those associated with the addresses being accessed. These modes may be operated upon based on the stored values then extracted to obtain the desired correlated super- (Continued)

position of the stored bit values in the addresses. The bits stored at the address locations may be classical bits, or may be qubits.

21 Claims, 14 Drawing Sheets

(51) Int. Cl.
  *G06N 10/40* (2022.01)
  *G06N 10/60* (2022.01)
(52) U.S. Cl.
  CPC .............. *G06N 10/20* (2022.01); *G06N 10/40* (2022.01); *G06N 10/60* (2022.01)

(56) References Cited

U.S. PATENT DOCUMENTS

| | | |
|---|---|---|
| 2004/0078421 A1 | 4/2004 | Routt |
| 2009/0010090 A1 | 1/2009 | Lloyd |
| 2018/0032895 A1 | 2/2018 | Jiang et al. |
| 2018/0226451 A1 | 8/2018 | Dzurak et al. |
| 2019/0270635 A1* | 9/2019 | Painter .................. G06N 10/00 |
| 2019/0288367 A1* | 9/2019 | Schuster .................. H01P 1/16 |
| 2019/0385088 A1* | 12/2019 | Naaman ................ H04L 49/101 |
| 2020/0412369 A1* | 12/2020 | Jiang ...................... G06N 10/20 |

OTHER PUBLICATIONS

Pechal, M., et al. "Superconducting switch for fast on-chip routing of quantum microwave fields." Physical Review Applied 6.2 (2016): 024009. (Year: 2016).*
International Search Report and Written Opinion in International Application No. PCT/US2020/020366, mailed May 20, 2020.
International Preliminary Report on Patentability in International Application No. PCT/US2020/020366, mailed Sep. 16, 2021.
Extended European Search Report for European Application No. 20765915.2, dated Nov. 14, 2022.
Carstens et al., Note on (active-)QRAM-style data access as a quantum circuit. arXiv preprint arXiv:1810.10759. Oct. 25, 2018:1-5.
Chu et al., Creation and control of multi-phonon Fock states in a bulk acoustic-wave resonator. Nature. Nov. 2018;563(7733):666-70.
Chu et al, Quantum acoustics with superconducting qubits. Science. Oct. 13, 2017;358(6360):199-202.
Friesen et al, Efficient Multiqubit Entanglement via a Spin Bus. Phys Rev Lett. Jun. 8, 2007;98(23):230503.
Gao et al., Entangling bosonic modes via an engineered exchange interaction. Nature. Feb. 27, 2019;566:509-12.
Giovannetti et al., Architectures for a quantum random access memory. Physical Review A. Nov. 5, 2008;78(5):052310.
Giovannetti et al, Quantum private queries. Phys Rev Lett. Jun. 13, 2008;100(23):230502.
MacCabe et al., Nano-acoustic resonator with ultralong phonon lifetime. Science. Nov. 13, 2020;370(6518):840-3.
Manenti et al, Circuit quantum acoustodynamics with surface acoustic waves. Nature communications. Oct. 17, 2017;8(1):975.
Naik et al, Random access quantum information processors using multimode circuit quantum electrodynamics. Nat Commun. Dec. 4, 2017;8(1):1904.
Nigg et al, Black-box superconducting circuit quantization. Phys Rev Lett. Jun. 15, 2012;108(24):240502.
Satzinger et al, Quantum control of surface acoustic wave phonons. Nature. Nov. 2018;563(7733):661-665.
Sletten et al., Resolving phonon Fock states in a multimode cavity with a double-slit qubit. Physical Review X. Jun. 20, 2019;9(2):021056.
Zhang et al, Engineering bilinear mode coupling in circuit qed: theory and experiment. Phys. Rev. A 99. Jan. 2019;99(1):012314.
Moiseev et al., Time-bin quantum RAM. Journal of Modern Optics. Nov. 12, 2016;63(20):2081-92. https://arxiv.org/pdf/1412.2459.pdf.

* cited by examiner

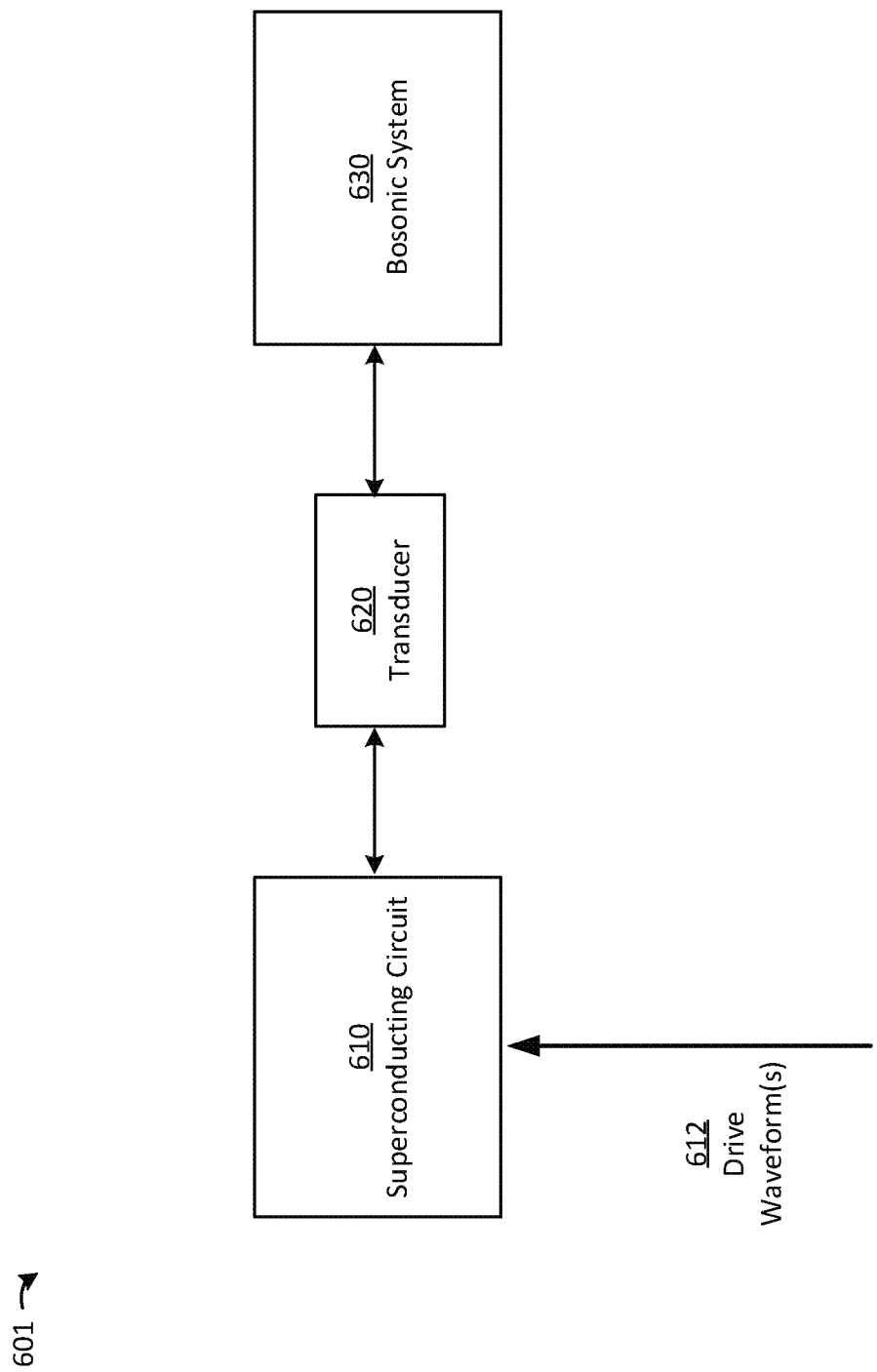

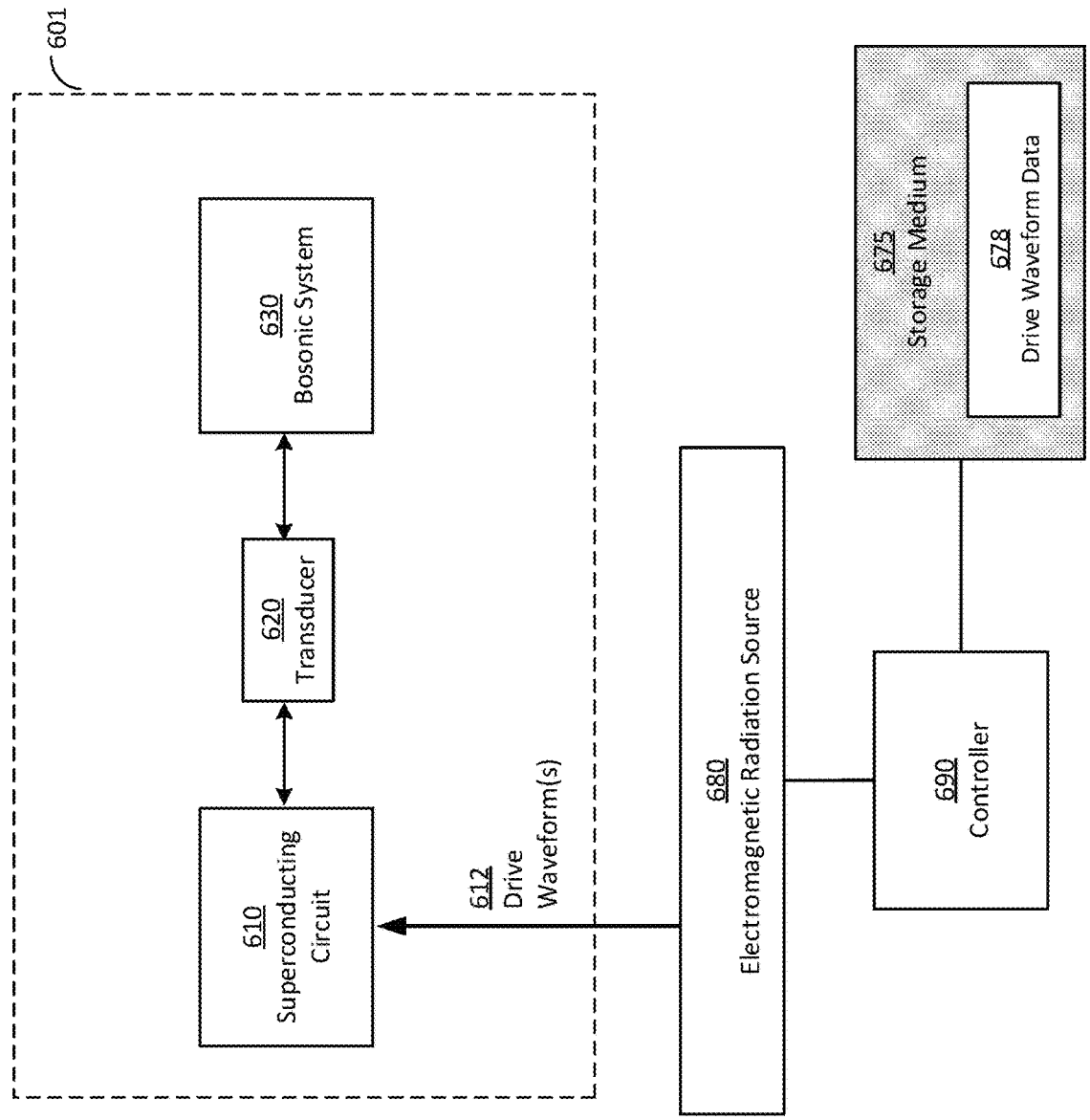

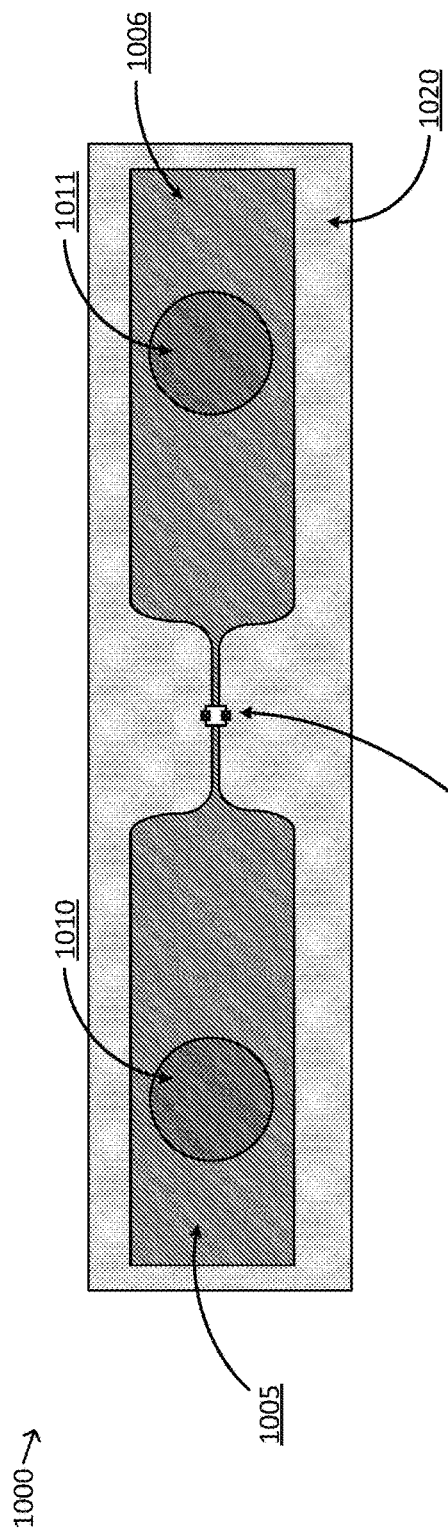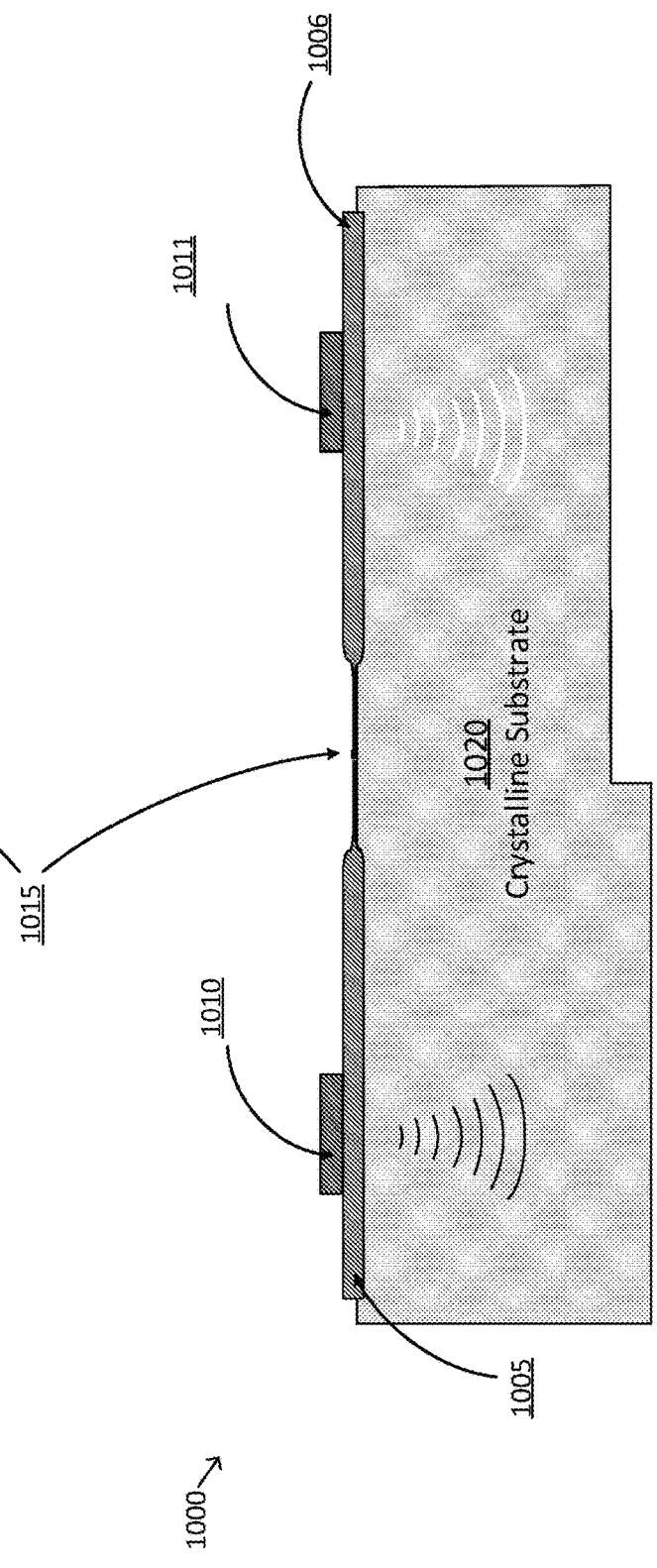

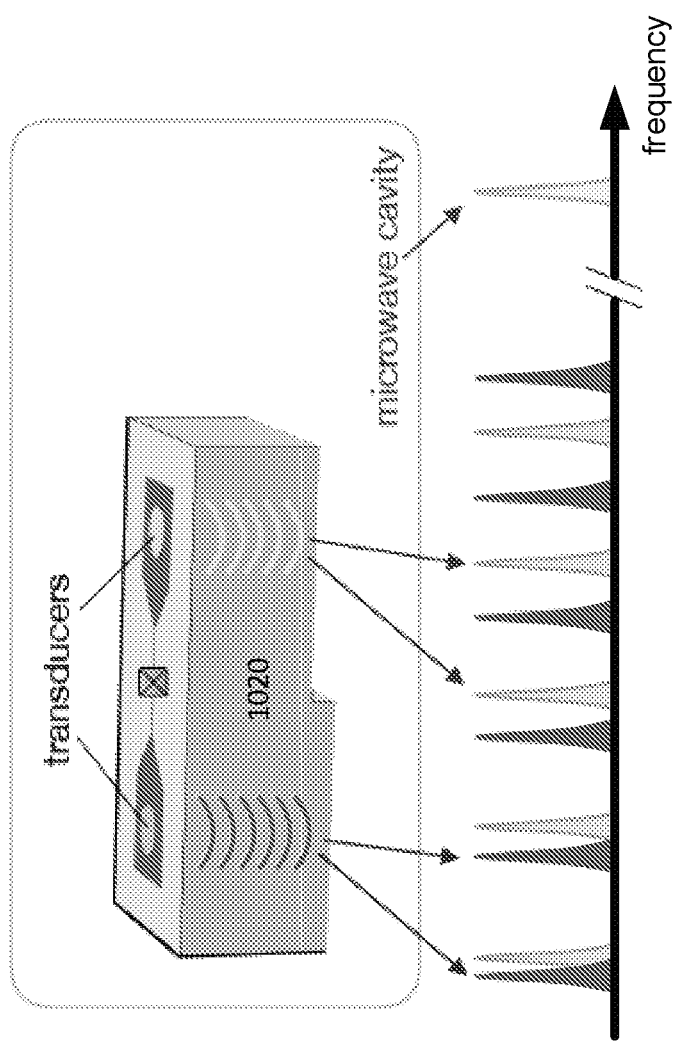

TECHNIQUES FOR QUANTUM MEMORY ADDRESSING AND RELATED SYSTEMS AND METHODS

CROSS-REFERENCE TO RELATED APPLICATIONS

The present application is a national stage filing under 35 U.S.C. § 371 of International Patent Application Serial No. PCT/US2020/020366, filed Feb. 28, 2020, entitled "TECHNIQUES FOR QUANTUM MEMORY ADDRESSING AND RELATED SYSTEMS AND METHODS", which claims the benefit under 35 U.S.C. § 119 (e) of U.S. Provisional Patent Application No. 62/812,533, filed Mar. 1, 2019, titled "Phonon Coupling for QRAM Disclosure,". The contents of these applications are hereby incorporated by reference in their entirety.

FEDERALLY SPONSORED RESEARCH

This invention was made with government support under W911NF-18-1-0212 awarded by the U.S. Army Research Office, 1122492 awarded by the National Science Foundation and FA9550-15-1-0015 awarded by the Air Force Office of Scientific Research. The government has certain rights in the invention.

BACKGROUND

Quantum information processing uses quantum mechanical phenomena, such as energy quantization, superposition, and entanglement, to encode and process information in a way not utilized by conventional information processing. For example, certain computational problems may be solved more efficiently using quantum computation rather than conventional classical computation. However, to become a viable computational option, it may be necessary to precisely control a large number of quantum bits, known as "qubits," and to control interactions between these qubits. In particular, qubits may ideally have long coherence times, be able to be individually manipulated, be able to interact with one or more other qubits to implement multi-qubit gates, be able to be initialized and measured efficiently, and be scalable so that a quantum computer can include large numbers of qubits.

A qubit may be formed from any physical quantum mechanical system with at least two orthogonal states. For example, photon polarization, electron spin, and nuclear spin are all two-level systems that may encode information and may therefore each be used as a qubit for quantum information processing. Different physical implementations of qubits have different advantages and disadvantages. For example, photon polarization benefits from long coherence times and simple single qubit manipulation, but suffers from the inability to create simple multi-qubit gates.

SUMMARY

According to some aspects, a method is provided of accessing an memory using a quantum address by operating a quantum router, the quantum router comprising a superconducting circuit coupled to a bosonic system, the bosonic system exhibiting non-uniformity in the frequency spacing of at least some modes of the bosonic system, the method comprising initializing a plurality of address qubits with values based on the quantum address, wherein each of the plurality of address qubits is represented by a respective mode of the bosonic system, initializing a plurality of register qubits, wherein each of the plurality of register qubits is represented by a respective mode of the bosonic system, performing a plurality of quantum gates by providing energy to the superconducting circuit, each quantum gate changing a state of at least one of the register qubits based at least in part on a state of one of the plurality of address qubits, and performing, by providing energy to the superconducting circuit, a phase shift of one or more of the register qubits according to values stored in the memory.

According to some embodiments, the memory is a classical memory storing a plurality of bits.

According to some embodiments, the method further comprises, for each bit of the plurality of bits stored in the memory, determining, based on a value of the bit, whether or not to perform a phase shift of a register qubit associated with the bit.

According to some embodiments, the method further comprises, performing a second plurality of quantum gates subsequent to performing the phase shift of one or more of the register qubits, the second plurality of quantum gates being based on states of the one or more phase shifted register qubits.

According to some embodiments, initializing a plurality of register qubits comprises initializing one of the register qubits with a bus value, and initializing the remainder of the register qubits to the same state as one another.

According to some embodiments, performing each quantum gate of the plurality of quantum gates comprises driving the superconducting circuit with two or more drives of different frequencies selected based on frequencies of modes of the bosonic system.

According to some embodiments, performing the plurality of quantum gates by providing energy to the superconducting circuit comprises performing a plurality of SWAP gates.

According to some embodiments, performing the plurality of quantum gates by providing energy to the superconducting circuit comprises performing a plurality of CZ gates.

According to some embodiments, performing the plurality of quantum gates by providing energy to the superconducting circuit comprises performing one or more of the plurality of quantum gates in a series of time steps, wherein the number of time steps in the series of time steps is of order log 2(N), wherein N is the number of bits stored by the memory.

According to some embodiments, the bosonic system comprises a crystal resonator.

According to some embodiments, the memory is a quantum memory storing a plurality of qubits.

According to some aspects, a quantum random access memory (QRAM) system is provided, comprising a memory, a quantum router comprising a superconducting circuit comprising at least one non-linear element, and a bosonic system coupled to the superconducting circuit, the bosonic system exhibiting non-uniformity in the frequency spacing of at least some modes of the bosonic system, and at least one controller configured to manipulate states of the modes of the bosonic system by applying energy to the superconducting circuit based on a quantum address representing a superposition of address locations within the memory.

According to some embodiments, the bosonic system comprises a crystal resonator.

According to some embodiments, the crystal resonator is a bulk acoustic wave (BAW) resonator or a surface acoustic wave (SAW) resonator.

According to some embodiments, the superconducting circuit comprises a transmon qubit.

According to some embodiments, the system further comprises a transducer coupling the superconducting circuit to the bosonic system.

According to some embodiments, the transducer comprises piezoelectric material.

According to some embodiments, the controller is configured to initialize a plurality of address qubits with values based on the quantum address, wherein each of the plurality of address qubits is represented by a respective mode of the bosonic system, initialize a plurality of register qubits, wherein each of the plurality of register qubits is represented by a respective mode of the bosonic system, and perform a plurality of quantum gates by providing energy to the superconducting circuit, each quantum gate changing a state of at least one of the register qubits based at least in part on a state of one of the plurality of address qubits.

According to some embodiments, performing each quantum gate of the plurality of quantum gates comprises driving the superconducting circuit with two drives of different frequencies selected based on frequencies of modes of the bosonic system.

According to some embodiments, the memory is a quantum memory storing a plurality of qubits.

According to some embodiments, the memory is a classical memory storing a plurality of bits.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 6A-6B depict an illustrative QRAM system for purposes of illustration, according to some embodiments.

FIGS. 10A-10C depict top, side and perspective views, respectively, of a BAW resonator that exploits a two mode families strategy to produce non-uniformity in the frequency spacing of phonon modes, according to some embodiments.

DETAILED DESCRIPTION

Quantum information may be stored in any of a variety of quantum mechanical systems. As noted above, quantum information may be stored using quantum bits, referred to as "qubits," which are typically quantum mechanical systems exhibiting two or more states. The state of a qubit can be used to encode quantum information. For example, a qubit may be realized as a quantum system that has a ground state and an excited state, and these two states may be used to denote quantum bit values of 0 and 1. Since the quantum system could be in a superposition of the two states, the qubit can also represent any quantum superposition of the 0 and 1 states.

Developing a quantum computer involves a number of different technical developments, some of which build upon each other. An initial requirement is to build a quantum system that can hold one bit of quantum information long enough for the qubit to be written, manipulated, and read. Once this has been achieved, quantum algorithms can be performed by manipulating these quantum systems, assuming a number of additional requirements, known as the DiVincenzo criteria, are also satisfied.

A number of quantum algorithms require access to a quantum random access memory, or "QRAM," which is a memory that can be accessed by a superposition of memory elements. A classical random access memory ("RAM") is a device that can query a database. Given an address as an input, the RAM can output an element (e.g., a bit value) stored at that address in the database. Analogously, a QRAM is a device that can query a database when given a superposition of addresses, and returns a correlated superposition of data from those addresses.

Figure 1A:
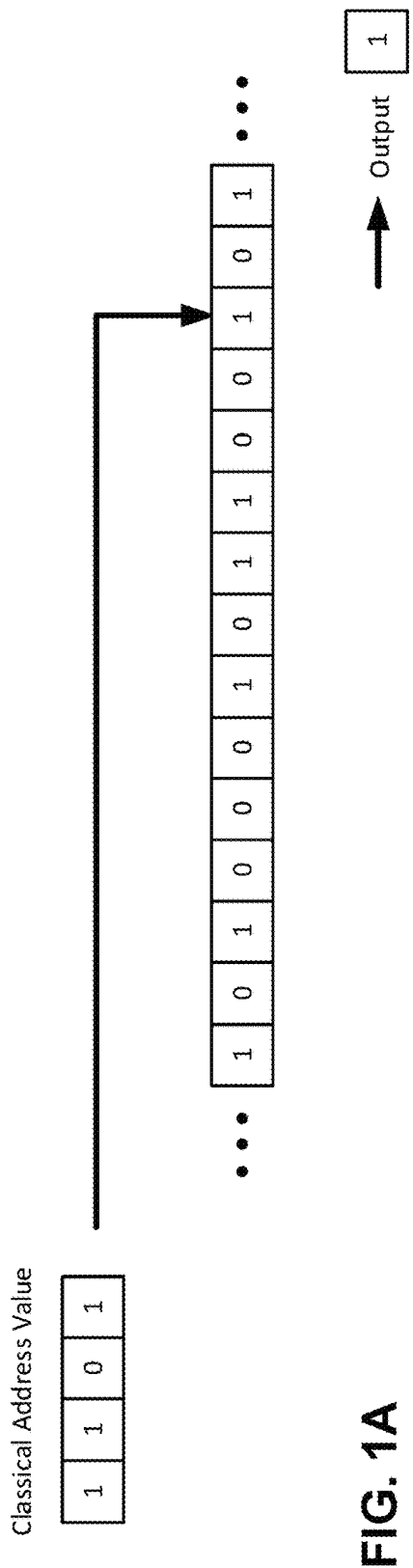
FIGS. 1A-1B illustrate querying of a database via a classical RAM and a QRAM, respectively
Figure 1B:
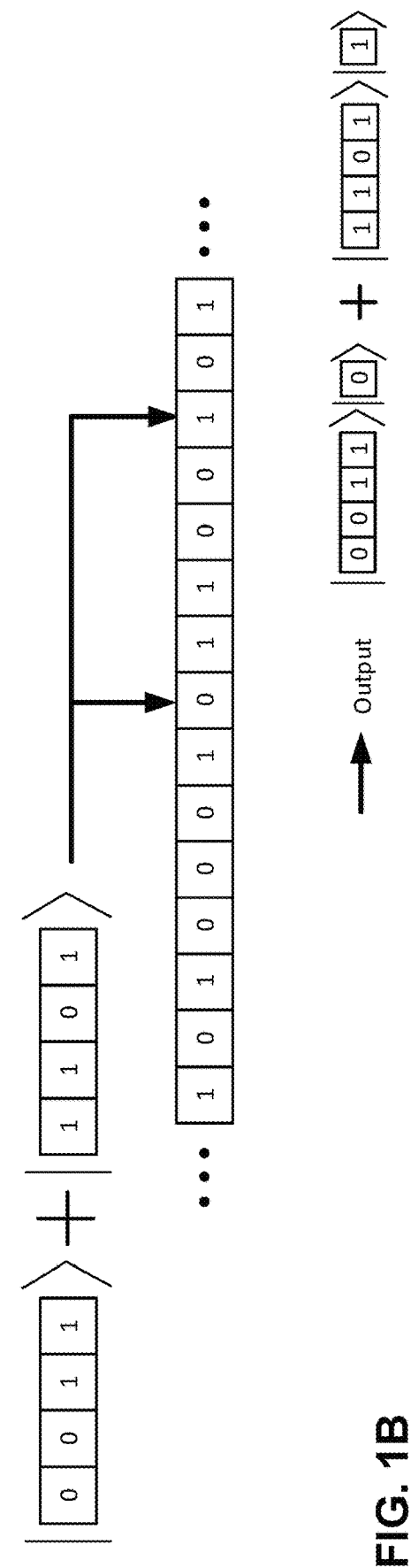

FIGS. 1A-1B illustrate querying of a database via a classical RAM and a QRAM, respectively. In the example of FIG. 1A, an address value of "1101" is provided as an input, and the classical RAM accesses a bit value stored at that address (which happens to have the value "1" in the illustrated example). This bit value is then output by the classical RAM. In the example of FIG. 1B, on the other hand, a quantum address value which is a superposition of addresses "0011" and "1101" is provided as input to a QRAM. The QRAM then produces an output in which the bit values stored at those memory locations are entangled with the respective addresses, which is $|0011\rangle|0\rangle + |1101\rangle|1\rangle$ in the example of FIG. 1B.

It should be noted that the QRAM described above differs from quantum memories that are given a classical address as input and output a qubit from the memory. These memories are sometimes called "random access quantum memories," and differ from a QRAM in that they accept a classical address as input, and as a result access a definite storage location. As such, the random access quantum memory is more akin to the example of FIG. 1A in which a classical address is provided as input, but the database stores qubits in the address locations, not classical bits as in FIG. 1A.

Despite the above-described concept of a QRAM being a desired component of a quantum information processing system, building a QRAM in practice presents several challenges. One major challenge is that a QRAM that is provided addresses with n bits, and can therefore access $2^n$ address locations, may therefore require the order of $2^n$ logic gates to access these locations. This limitation may cause a QRAM to require a great deal of hardware, even for comparatively small memories. Furthermore, operating the number of qubits sufficient to successfully perform access of a QRAM without said qubits decohering during the process may be difficult given the current state of the art.

The inventors have recognized and appreciated techniques for implementing a QRAM by routing quantum information through multiple modes of a bosonic system. As described herein, a bosonic system may be configured to maintain quantum information in a large number of independent modes at the same time. Suitable operations upon these modes may allow a quantum address value to be routed to modes associated with respective bits such that the only modes altered by the operations are those associated with the addresses being accessed. These modes may be operated upon based on the stored values then their values extracted to obtain the desired correlated superposition of the stored bit values in the addresses. The bits stored at the address locations may be classical bits, or may be qubits.

In some embodiments, operations upon the modes of the bosonic system may be performed in parallel to one another, allowing efficient manipulation of the bosonic modes to route the address information to the modes associated with the (qu)bits of the memory. This operational efficiency coupled with the hardware efficiency of operating a single bosonic system that maintains many modes at the same time leads to a compact QRAM that can be operated in the order of $\log_2(N)$ operational steps for a memory with N address locations (e.g., order of 3 steps for 8 memory locations, etc.).

Various experimental configurations may be envisioned to initialize and maintain plural independent modes of a bosonic system, and to allow gates to be performed between the modes of the bosonic system. Examples of suitable systems are described further below. According to some embodiments, at least some interactions may be driven between the bosonic system and a coupled superconducting circuit via four-wave mixing. In particular, the application of suitable drives to the superconducting circuit may cause four-wave mixing with one or more modes of the bosonic system. Accordingly, modes of the bosonic system may be manipulated by such drives. Manipulations via four-wave mixing may include single-mode squeezing, two-mode squeezing, three-mode couplings, and four-mode couplings. Interactions between the superconducting circuit and the bosonic system may not be limited to only four-wave mixing interactions, however, three-wave mixing may also be realized through suitable application of energy to suitable component(s) of the superconducting circuit.

According to some embodiments, the bosonic system may exhibit a non-uniformity in the frequency spacing of at least one of its modes. If the modes of the bosonic modes were uniformly spaced in frequency space, coupling to one of the modes may easily cause unwanted coupling to one of the other modes. As a result, it may be beneficial to engineer the bosonic system to exhibit some kind of non-uniformity in the frequency spacing of the modes so that such unwanted couplings are not resonant. The resulting system may allow selective coupling to a desired single mode of the bosonic system (e.g., by driving interactions between the bosonic system and a coupled superconducting circuit as noted above). Suitable approaches to introduce a suitable non-uniformity in the frequency spacing of the modes of the bosonic system include coupling the bosonic system to an external mode and/or configuring the bosonic system to exhibit multiple mode families with different frequency spacing.

Following below are more detailed descriptions of various concepts related to, and embodiments of, techniques for techniques for implementing a QRAM by routing quantum information through multiple modes of a bosonic system. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 2A:
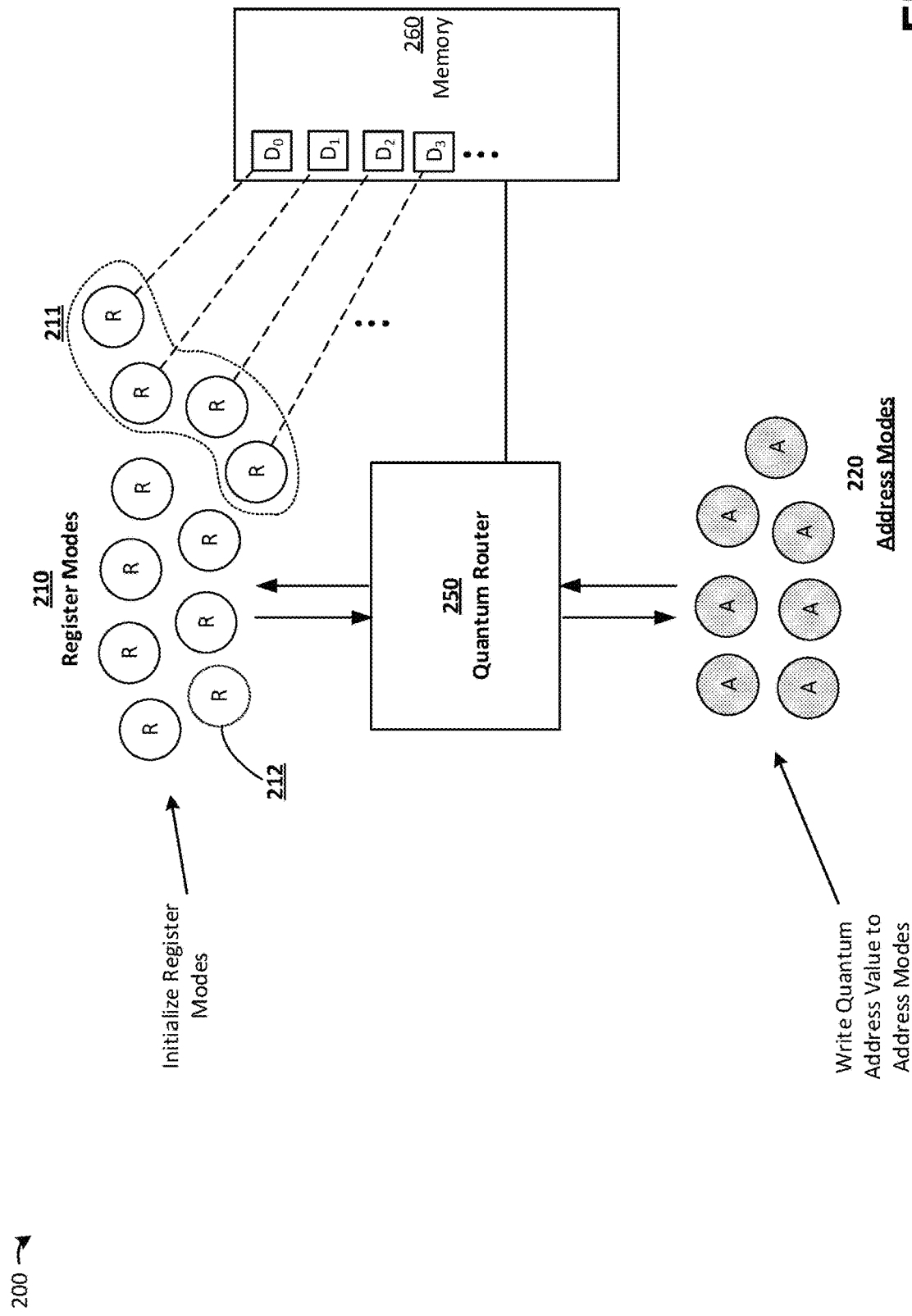
FIG. 2A illustrates components of a QRAM, according to some embodiments

FIG. 2A illustrates components of a QRAM, according to some embodiments. While specific approaches to building a QRAM are discussed below, initially the components of a QRAM are introduced for purposes of explanation, since the techniques for operating a QRAM described herein are not limited to any particular technical implementation. Furthermore, while the below description focuses primarily on accessing bits from a classical memory, this is purely for purposes of explanation and it will be appreciated that the below techniques may also be applied to access qubits from a memory.

In the example of FIG. 2A, QRAM 200 includes a plurality of modes of a bosonic system, some of which are considered "register modes," and some of which are considered "address modes." This distinction is not a physical one—rather, for purposes of operation some of the modes are labeled as register modes and some as address modes. In the example of FIG. 2A, therefore, each circle represents a separate and independent mode of the bosonic system. Quantum router 250 is configured to perform operations, including quantum gates, between two or more of the modes, which may include register modes and/or address modes. Memory 260 stores a plurality of (qu)bits $D_N$, each of which is associated with one of a subset of the register modes 211 as shown by the dashed lines.

During operation, QRAM 200 initially stores information on a quantum address to be accessed in one or more of the address modes. This information may be represented in any suitable way, including by treating address modes as qubits and storing each qubit of the quantum address in one of the address modes. Similarly, register modes are initialized with initial values in preparation for operations by the quantum router.

Subsequently, the quantum router performs a plurality of operations upon the register modes and/or the address modes so that states of the register modes are manipulated based on the address information stored in the address modes. At the end of this process, the N register modes associated with each of the bits of memory 260 store information about the bits of the memory that are to be accessed. As noted above, since in general a quantum address is a superposition of address locations, in general the register modes 211, which are associated with the bits $D_N$ of memory 260, will be in a correlated superposition.

Once register modes 211 have been manipulated according to the quantum address information, these modes may be further manipulated according to the value stored in the memory so that the state of one or more of the register modes 211 reflects the value stored in the respective bits of the memory. Note that determining which of the register modes 211 have been manipulated since initialization would cause states of the register modes 211 to collapse and this information would be lost. As such, the same procedure is performed with respect to each of the register modes 211 according to the value stored in the memory. This procedure need not comprise manipulating each of the register modes 211 so long as each register mode is treated the same. For instance, further manipulation of register modes 211 according to the respective bits stored in the memory may comprise performing one type of operation on the relevant register mode when the bit has one value (0 or 1), and performing a different type of operation, or no operation, on the relevant register mode when the bit has the opposing value (1 or 0).

According to some embodiments, the memory 260 may be a classical memory, in which case the operation performed with respect to each of the register modes 211 may comprise a phase shift operation. In particular, the operation may comprise imparting a phase to the mode according to the classical bit value.

According to some embodiments, the memory 260 may be a quantum memory, in which case the operation performed with respect to each of the register modes 211 may comprise operations that extract the data qubit from the memory into a register mode conditioned on the value of the value of the associated register modes amongst register modes 211.

Figure 2B:
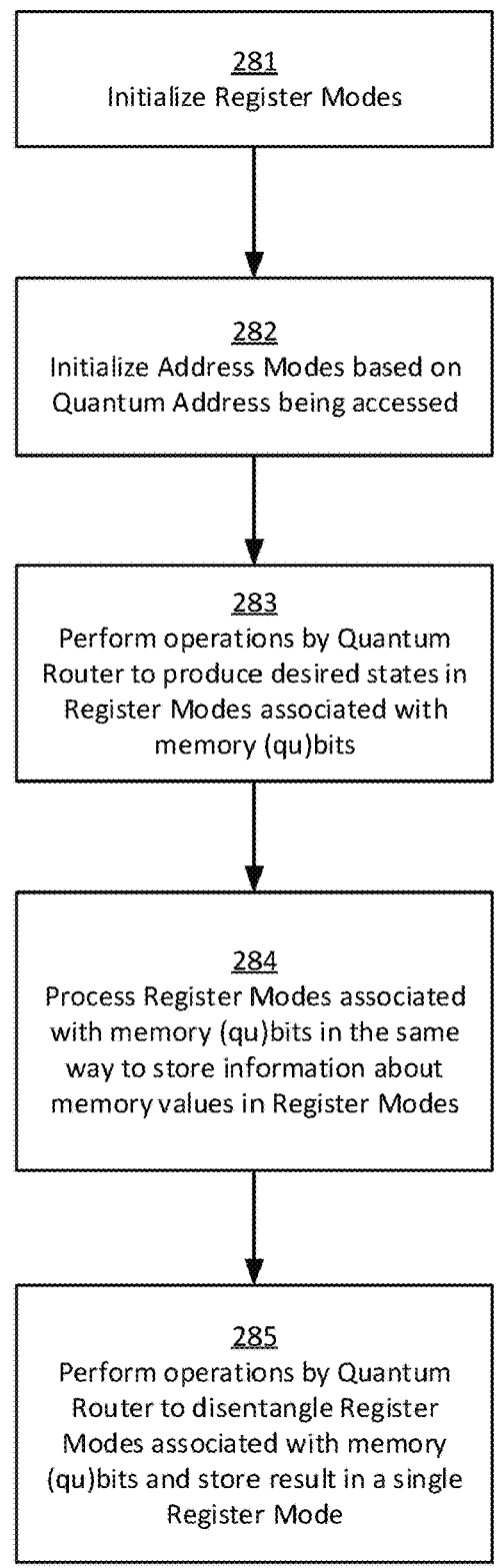
FIG. 2B is a flowchart of a method of performing a read operation using a QRAM, according to some embodiments.

At this stage the register modes are in a superposition of address locations and also carry information about the value stored by the memory 260 at these address locations. To extract this information, the quantum router performs a plurality of operations upon the register modes and/or the address modes so that the information becomes stored in a single mode rather than across several entangled modes. The above process is summarized in method 280 shown in FIG. 2B.

In some embodiments, one of the register modes 212 may be designated a "bus" mode. The bus mode may be manipulated during initialization of the register modes to have an initial, known state, and manipulated during the above-described process so that the mode is routed to one of the N register modes associated with each of the bits of memory 260. As a result, at the end of the process, the bus mode stores information about the bits of memory that are to be accessed. The bus mode may be a single physical mode of the bosonic system, or may in some cases be represented by a superposition of multiple modes of the bosonic system.

Figure 3:
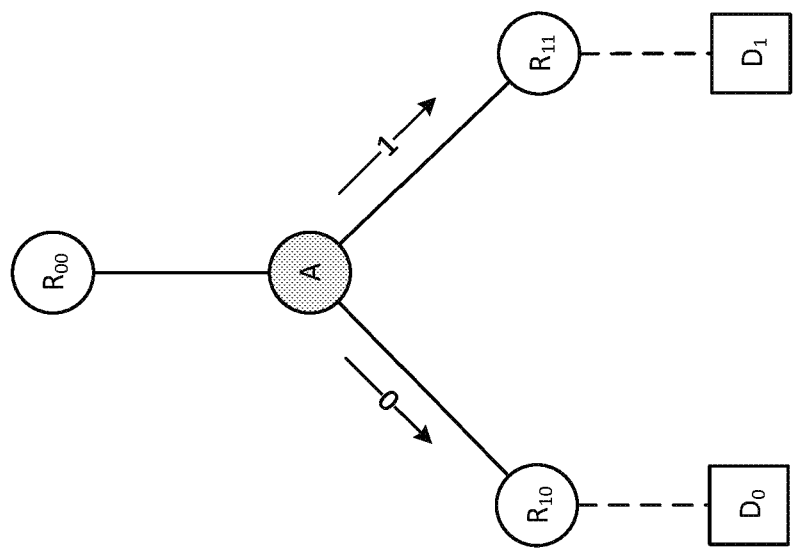
FIG. 3 depicts an example of routing information in a QRAM in which a classical memory stores two bit values, according to some embodiments.

While the above-described process may be represented in any number of suitable ways, an illustrative approach based on a binary tree will now be described. FIG. 3 depicts an example arrangement of register and address modes using this approach wherein a classical memory stores bit values $D_0$ and $D_1$. The tree structure of FIG. 3 is merely a convenience to represent how information travels between register and address modes of the QRAM, and it will be appreciated that FIG. 3 is an illustrative example of the relationships between address modes and register modes that may be applied within the system of FIG. 2.

The illustrative modes of a QRAM system shown in FIG. 3 store qubit values within 4 modes of a bosonic system to perform read operations, the 4 modes being the 3 register modes $R_{00}$, $R_{10}$ and $R_{11}$, and an address mode A. In the example of FIG. 3, when the quantum router performs operations on the illustrated modes, the address mode A acts like a router, producing resulting states in the register modes $R_{10}$ and $R_{11}$ based on the states of the register mode $R_{00}$ and the address mode.

In the system of FIG. 3, during initialization address bit A is initialized with a qubit value of the address to be read from the 2 bit classical memory. As discussed above, in a QRAM the address may in general be a superposition of memory locations. Also during initialization, the router modes $R_{10}$ and $R_{11}$ are initialized with qubit values of $|0\rangle$, and the router mode $R_{00}$ is initialized with a "bus value" having a known state that can be subsequently manipulated in order to encode the value read from the memory in the bus value. For instance, the bus value could be initialized to $|+\rangle = |0\rangle + |1\rangle$ (or to $|-\rangle = |0\rangle - |1\rangle$) and the phase of the bus value subsequently manipulated to encode the value read from the memory. Any suitable value may be chosen as appropriate for the bus value, although the choice affects subsequent operations, as discussed below.

Now that the register and router modes have been initialized, the quantum router performs a routing operation as follows. The "downstream" routing operation, as it will be referred to henceforth, directs the value of the register mode $R_{00}$ to the register mode $R_{10}$ when the value of address mode A is $|0\rangle$, and directs the value of the register mode $R_{00}$ to the register mode $R_{11}$ when the value of address mode A is $|1\rangle$. This routing effect is denoted in FIG. 3 by the arrows along the lines connecting the address mode to the register modes $R_{10}$ and $R_{11}$. The downstream routing operation may, for example, be performed through application of a SWAP gate and a controlled-SWAP gate as discussed below.

As a result of the downstream routing operation, the register modes $R_{10}$ and $R_{11}$ have qubit states indicative of the quantum address being accessed by the QRAM, and that was initialized in the address mode A. In particular, the bus value initially stored in the router mode $R_{00}$ is now stored in router mode $R_{10}$, in router mode $R_{11}$, or more generally in superposition in router modes $R_{10}$ and $R_{11}$.

The value of the bit stored in the classical memory locations $D_0$ and $D_1$ may be applied to the router modes $R_{10}$ and $R_{11}$ by performing, or not performing, an operation upon those router modes based on the classical bit value. To use the above example in which the bus qubit is initialized to be in the $|+\rangle$ state: if the classical bit value is 0, no phase shift is performed upon the bus qubit. If the classical bit value is 1, a phase shift is applied to flip the state of the bus qubit. Specifically, the bus is flipped from $|+\rangle$ to $|-\rangle$ if the bus were initialized to $|+\rangle$, and from $|-\rangle$ to $|+\rangle$ if the bus were initialized to $|-\rangle$. As noted above, since this procedure is followed in the same manner for each of the router modes $R_{10}$ and $R_{11}$ based on their associated classical bits $D_0$ and $D_1$, respectively, the information represented by router modes $R_{10}$ and $R_{11}$ should remain intact.

At this stage, the bus value has been routed to one or more of the router modes $R_{10}$ and $R_{11}$ and modified so that it carries information about the classical bit value(s) in the quantum address location being accessed. As such, an "upstream routing operation" is performed to pass the router mode states $R_{10}$ and $R_{11}$ back to the router mode $R_{00}$. The upstream routing operation directs the value of the register mode $R_{10}$ to the register mode $R_{00}$ when the value of address mode A is $|0\rangle$, and directs the value of the register mode $R_{11}$ to the register mode $R_{00}$ when the value of address mode A is $|1\rangle$. The result of this process is that the register mode $R_{00}$ stores a qubit representing the value stored at the accessed quantum memory address, or a superposition thereof.

Note that, if in the example of FIG. 3 the two classical bits $D_0$ and $D_1$ were instead qubits, different operations may be performed to apply the value of the qubits stored in the memory locations than would be performed for classical bits. As one example, a pair of controlled-SWAP (C-SWAP) operations may be performed to apply the value of the qubits stored in the memory locations. In particular, a first C-SWAP operation which swaps the $R_{00}$ register mode with the qubit $D_1$ conditionally on the value of the register mode $R_{11}$, and a second C-SWAP which swaps the $R_{00}$ register mode with the qubit $D_0$ conditionally on the value of the register mode $R_{10}$. As another example, the $R_{00}$ register mode could be entangled with each of the register modes $R_{10}$ and $R_{11}$ via respective CNOT gates.

Figure 4A:
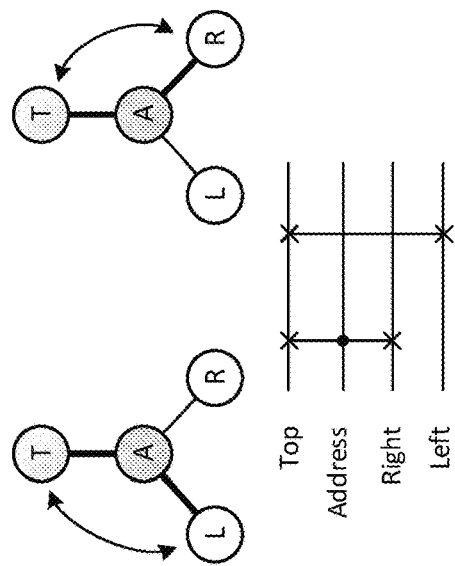
FIGS. 4A-4C depict various routing operations that may be performed by a QRAM, according to some embodiments.
Figure 4B:
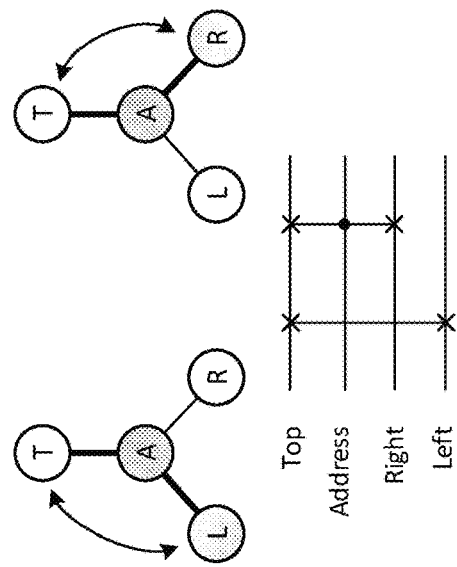
Figure 4C:
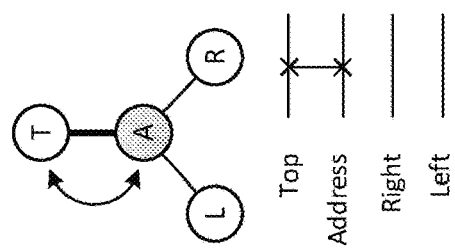

The operations that enable the above-described routing process of FIG. 3 are shown in greater detail in FIGS. 4A-4C. Illustrative practical implementations of these gates are discussed further below.

FIG. 4A depicts a SWAP gate, which exchanges the states of two qubits and is performed in the illustrative binary tree approach of FIG. 3 to initialize selected modes of the bosonic system (e.g., the address mode).

The downstream routing operation, shown in FIG. 4B, also includes a SWAP gate. Specifically, the downstream routing operation comprises a C-SWAP gate followed by a SWAP gate. The C-SWAP gate is equivalent to a beamsplitter operation, followed by a controlled-phase (CZ) gate, followed by an inverse beamsplitter operation. The C-SWAP therefore swaps the top and right qubits conditionally on the value of the address qubit. The net result of these gates is that, when the address qubit in FIG. 4B has the value $|1\rangle$, the value of the top qubit is swapped with the right qubit, and when the address qubit has the value $|0\rangle$, the value of the top qubit is swapped with the left qubit.

FIG. 4C depicts the upstream routing operation, which is the same operation as that shown in FIG. 4B except the SWAP operation is performed first, then the C-SWAP operation is performed. The net result of these gates is that, when the address qubit in FIG. 4B has the value $|1\rangle$, the value of the right qubit is swapped with the top qubit, and when the address qubit has the value $|0\rangle$, the value of the left qubit is swapped with the top qubit.

Figure 5:
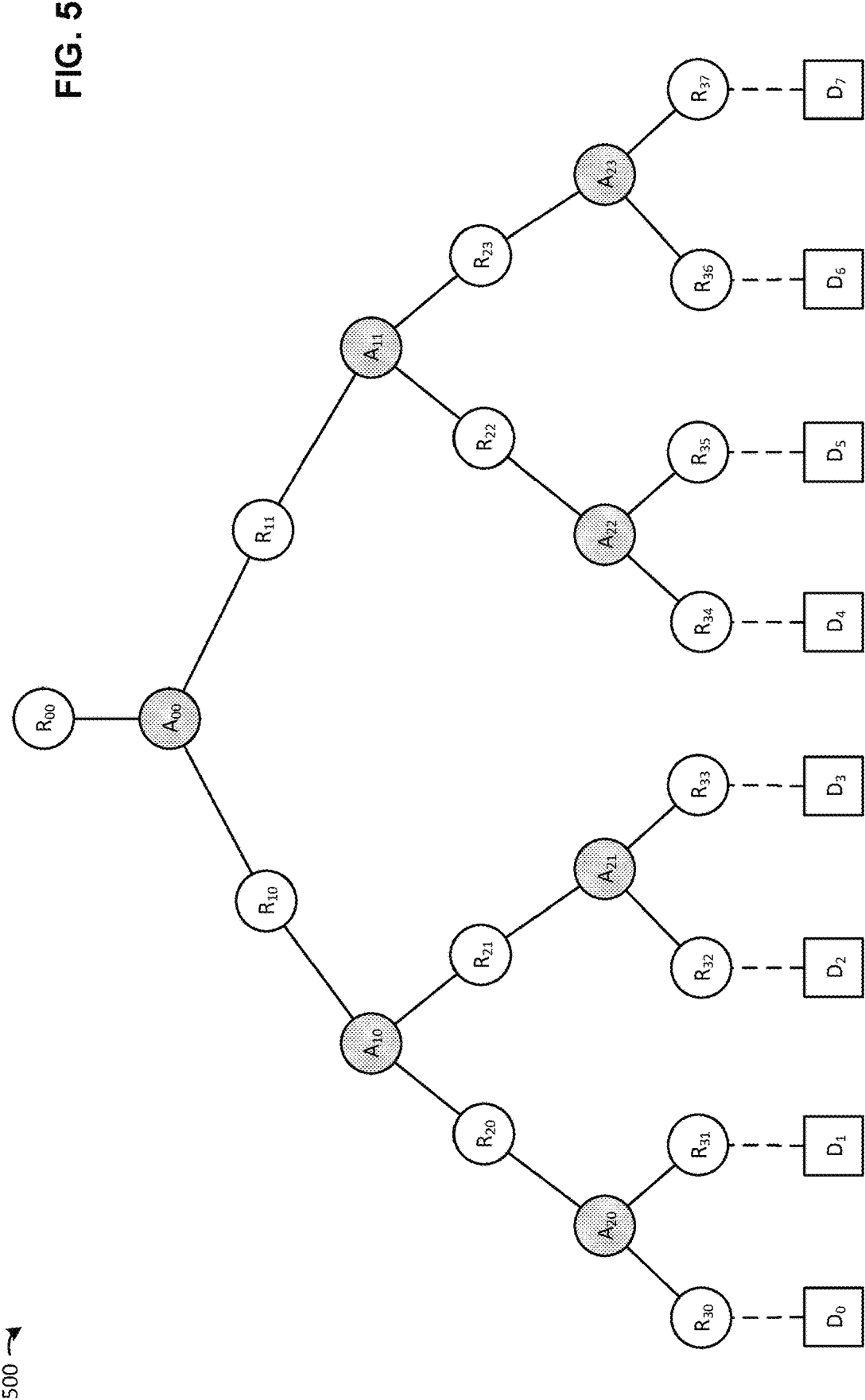
FIG. 5 depicts an example of routing information in a QRAM in which a classical memory stores eight bit values, according to some embodiments.

Performing the gates shown in FIGS. 4A-4C in the correct sequence with an appropriate collection of independent bosonic modes can thereby produce the QRAM routing as described above in relation to FIG. 3. FIG. 5 depicts a more complex example of said routing, but essentially the same process is followed as that of FIG. 3, as described below.

FIG. 5 depicts an example of a QRAM in which a classical memory stores bit values $D_0, D_1, \ldots D_8$. The illustrative QRAM system stores qubit values within 22 modes of a bosonic system to perform read operations, the 22 modes being the 15 register modes $R_{ij}$ and 7 address modes $A_{ij}$. In the example of FIG. 5, when the quantum router performs operations on the illustrated modes, the address modes $A_{00}, A_{10}, A_{11}, A_{20}, A_{21}, A_{22}$, and $A_{23}$ each acts like a router, producing resulting states in the connected register modes based on the states of at least one of the connected register modes and the address mode. These routing operations are the same downstream routing and upstream routing operations discussed above.

In the system of FIG. 5, during initialization the address qubits are initialized with qubit values of the quantum address to be read from the 8 bit classical memory. Initialization of the address qubits may be performed through a series of SWAP and downstream routing operations. Specifically, the address qubit at the highest level ($A_{00}$ in FIG. 5) may be initialized to the first qubit of the quantum address either by directly writing the address qubit to the relevant bosonic mode representing $A_{00}$, or by writing the address qubit to the bosonic mode representing the initial register qubit $R_{00}$ and performing a SWAP between $R_{00}$ and $A_{00}$. The address qubits at the next level of the tree (e.g., $A_{10}$ and $A_{11}$) may then be initialized by writing the next address qubit to the top of the tree $R_{00}$ and performing a downstream routing operation on the highest level address qubit $A_{00}$. This will cause the next address qubit to be written to the register qubits $R_{10}$ and/or $R_{11}$ depending on the value of the first address qubit stored in $A_{00}$. Subsequently, SWAP operations may be performed between each of the second level register qubits and the associated address qubits (e.g., SWAP between $R_{10}$ and $A_{10}$ and SWAP between $R_{11}$ and $A_{11}$ in the example of FIG. 5).

This process may be performed again from the top of the tree for successive address qubits from the quantum address. That is, for each address qubit, direct the address qubit to relevant level of the tree by writing it to the uppermost register $R_{00}$, performing a downstream routing operation at the top level, performing a SWAP at each of the second level register qubits and their associated address qubits, performing downstream routing operations at each of the second level address qubits, performing a SWAP at each of the third level register qubits and their associated address qubits, etc.

As with the example of FIG. 3, subsequent to initialization, a bus value is written to the uppermost register $R_{00}$ and a series of downstream routing operations are performed. In the example of FIG. 5, since there are 7 address qubits, a downstream routing operation is performed for each of the 7 address qubits. These operations are performed one level at a time, working downward. Although not all of these operations may result in changes to the associated register qubits, since it is unknown which paths are followed as a result of the address qubit values, all of the routing operations are performed.

In some embodiments, multiple downstream routing operations may be performed in parallel so that at least two of the operations are being performed at the same time. For instance, in the example of FIG. 5, the two downstream routing operations upon address qubits $A_{10}$ and $A_{11}$ may be performed at the same time, since each operates on an independent set of bosonic modes from the others. As such, downstream routing operations can be performed in one time window for each level of the binary tree when performing downstream routing operations in parallel. In the example of FIG. 5, for instance, the three time windows may comprise downstream routing operations on: (1) $A_{00}$; (2) $A_{10}$ and $A_{11}$; and (3) $A_{20}, A_{21}, A_{22}$ and $A_{23}$.

As with the example of FIG. 3, at the end of this process the register modes $R_{30}, R_{31}, \ldots R_{37}$ have qubit states indicative of the quantum address being accessed by the QRAM, and that was initialized in the address modes A. The value of the bit stored in each of the classical memory locations $D_0, D_1, \ldots D_8$ may be applied to respective router modes $R_{30}, R_{31}, \ldots R_{37}$ by performing, or not performing, a phase shift of those router modes based on the classical bit value.

To extract the read value(s), upstream routing operation may then be performed for each of the 7 address qubits, one level at a time, working upward. In some embodiments, multiple upstream routing operations may be performed in parallel so that at least two of the operations are being performed at the same time. For instance, in the example of FIG. 5, the two upstream routing operations upon address qubits $A_{10}$ and $A_{11}$ may be performed at the same time, since each operates on an independent set of bosonic modes from the others. As such, upstream routing operations can be performed in one time window for each level of the binary tree when performing upstream routing operations in parallel. In the example of FIG. 5, for instance, the three time windows may comprise upstream routing operations on: (1) $A_{20}$, $A_{21}$, $A_{22}$ and $A_{23}$; (2) $A_{10}$ and $A_{11}$; and (3) $A_{00}$.

Note that, for if in the example of FIG. 5 the eight classical bits $D_0, D_1, \ldots D_7$ were instead qubits, as discussed above the relevant operation to apply the value of the qubits stored in the memory locations to the associated paths is a pair of controlled-SWAP (C-SWAP) operations. In particular, a first C-SWAP operation which swaps the $R_{20}$ register mode with the qubit $D_0$ conditionally on the value of the register mode $R_{30}$, a second C-SWAP which swaps the $R_{20}$ register mode with the qubit $D_1$ conditionally on the value of the register mode $R_{31}$, etc. In full, therefore eight pairs of such C-SWAP operations may be performed.

The aforementioned techniques provide a process for implementing a QRAM by routing quantum information through multiple modes of a bosonic system, and may be practiced using any suitable system. FIGS. 6A-6B depict an illustrative QRAM system for purposes of illustration, according to some embodiments.

In the example of FIG. 6A, QRAM system 601 comprises a superconducting circuit 610, a bosonic system 630, and a transducer 620 which couples the superconducting circuit to the bosonic system. The system 601 is configured to receive drive waveforms 612 at the superconducting circuit, which may cause states of the bosonic system 630 to be manipulated via the coupling between the superconducting circuit and the bosonic system through transducer 620. FIG. 6B, to be discussed further below, provides an example of a system that includes components suitable for applying the drive waveforms to the QRAM system 601.

According to some embodiments, superconducting circuit 610 may comprise at least one non-linear circuit element. Engineering the superconducting circuit 610 to exhibit some kind of non-linearity may be desirable (or critical) for the drive waveforms 612 to create their desired effects upon the bosonic system. For instance, superconducting circuit 610 may comprise, or may consist of, one or more Josephson junctions. In some embodiments, superconducting circuit 610 comprises, or consists of, a transmon qubit. In some embodiments, superconducting circuit 610 comprises, or consists of, a Superconducting Nonlinear Asymmetric Inductive Element (SNAIL).

According to some embodiments, bosonic system 630 comprises one or more resonating materials, such that the bosonic modes of the bosonic system 630 are phonon modes. In some cases, bosonic system 630 comprises one or more crystals configured as a resonator, which may include one or more bulk acoustic wave (BAW) resonators, surface acoustic wave (SAW) resonators, and/or phononic crystal cavities. Other suitable implementations of bosonic system 630 may include a magnon system, and microwave cavities or resonators.

According to some embodiments, bosonic system 630 may exhibit a non-uniformity in the frequency spacing of at least one of its modes. As noted above, if the modes of the bosonic modes were uniformly spread in frequency space, coupling to one of the modes may easily cause unwanted coupling to one of the other modes. As a result, it may be beneficial to engineer the bosonic system 630 to exhibit some kind of non-uniformity in the frequency spacing of its modes so that such unwanted couplings are not resonant. The resulting system may allow selective coupling to a desired single mode of the bosonic system by driving interactions between the bosonic system 630 and the superconducting circuit 610 via the drive waveforms 612. Suitable approaches to introduce a suitable non-uniformity in the frequency spacing of the modes of the bosonic system include coupling the bosonic system to an external mode and/or configuring the bosonic system to exhibit multiple mode families with different frequency spacing.

According to some embodiments, transducer 620 may include any component or components that produce a coupling between the superconducting circuit 610 and the bosonic system 630. The form of transducer 620 may depend on the particular implementation of the superconducting circuit 610 and/or of the bosonic system 630, and in some cases may not be required if a direct coupling between the superconducting circuit 610 and the bosonic system 630 may be envisioned. In some embodiments, the bosonic system 630 may support phonon modes, and transducer 620 may comprise one or more piezoelectric components which may allow coupling of an electric field of the superconducting circuit 610 to the phonon modes. In some embodiments, the bosonic system 630 may support magnon modes, and transducer 620 may comprise an electromagnetic field that may be controlled by the superconducting circuit 610 to produce spin waves within the bosonic system 630.

Turning to FIG. 6B, QRAM system 601 shown in FIG. 6A is depicted in system 650, which also includes a controller 690 coupled to a source of electromagnetic radiation 680. The controller 690 may be configured to operate the source 680 to produce drive waveforms 612 and to provide the drives to the superconducting circuit 610 as described above. In some embodiments, controller 690 may be operated to supply multiple drive waveforms to the superconducting circuit 610 at the same time (e.g., to perform multiple gates in parallel as described above).

Controller 690 may, for instance, comprise a general purpose processor, FPGA, and/or ASIC that may be operated to produce a desired sequence of gates through successive applications of drive waveforms 612. The controller 690 is coupled to a storage medium 675, which stores data that may be accessed by the controller 690 to produce said drive waveforms. The drive waveform data may in some instances comprise a sequence of time-amplitude values for more complex waveforms, or may simple comprise frequency values in cases where a drive waveform is an oscillating signal of a fixed amplitude at a certain selected frequency. In cases in which controller 690 is a general purpose processor, the storage medium 675 may store instructions (e.g., software) that may be executed by the controller 690 to operate the source 680 and provide the drive waveforms to the superconducting circuit 610.

Figure 7A:
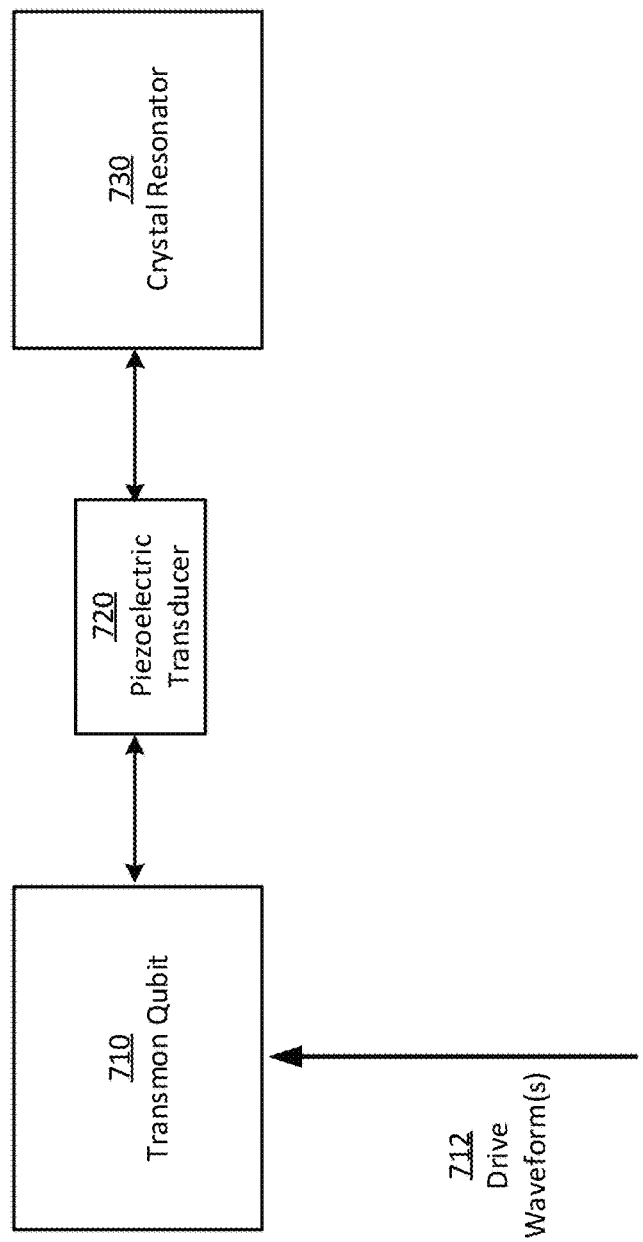
FIG. 7A depicts an implementation of the QRAM system 601 of FIGS. 6A and 6B comprising a crystal resonator, according to some embodiments.

FIG. 7A depicts a particular implementation of the QRAM system 601 of FIGS. 6A and 6B. In the example of FIG. 7A, QRAM system 701 includes a transmon qubit 710 as the superconducting system, a crystal resonator 730 as the bosonic system, and a piezoelectric transducer 720 as the transducer.

Irrespective of whether the crystal resonator 730 supports, for instance, a BAW resonator, a SAW resonator, or an array of phononic crystal resonators, the QRAM system 701 may be described by the Hamiltonian:

$$H = \omega_q q^\dagger q - \frac{\alpha}{2} q^\dagger q^\dagger q q + \sum_k \left( \omega_k m_k^\dagger m_k + g_k q^\dagger m_k + g_k^* q m_k^\dagger \right) + H_d$$

In the above, q and $m_k$ denote the annihilation operators for the transmon qubit and phonon modes, respectively; $\omega_q$ is the frequency of the transmon qubit. The transmon qubit 710 is modeled as an anharmonic oscillator with Kerr nonlinearity $\alpha$ and is coupled to the $k^{th}$ phonon mode with coupling strength $g_k$. $H_d$ is the Hamiltonian for the external drive waveforms 712, which may be given by:

$$H_d = \Sigma_j \Omega_j q^\dagger e^{-i\omega_j t} + \text{H.c.}$$

In the above, $\Omega_j$ is the detuning strength, and $\omega_j$ is the frequency of, the $j^{th}$ drive tone ("H.c." is shorthand for the Hermitian conjugate).

In the illustrative system 701, interactions between phonon modes of the crystal resonator can be engineered by applying off-resonant drives 712 to the transmon qubit 710. In particular, the Kerr nonlinearity of the transmon qubit enables it to act as a four-wave mixer, so phonons can be converted from one frequency to another by driving the transmon qubit.

Figure 7B:
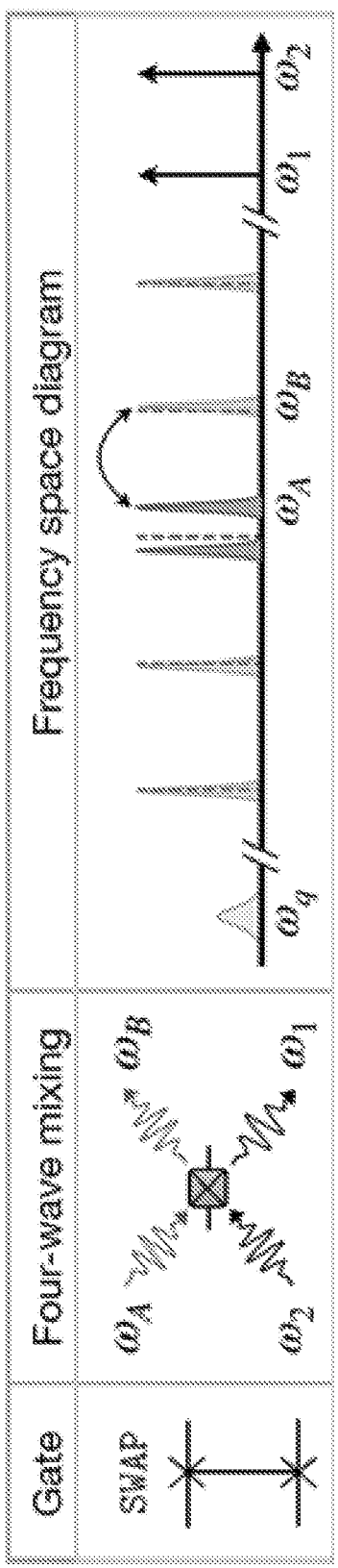
FIGS. 7B and 7C illustrate operations to perform SWAP and CZ gates in the context of the system of FIG. 7A, according to some embodiments.
Figure 7C:
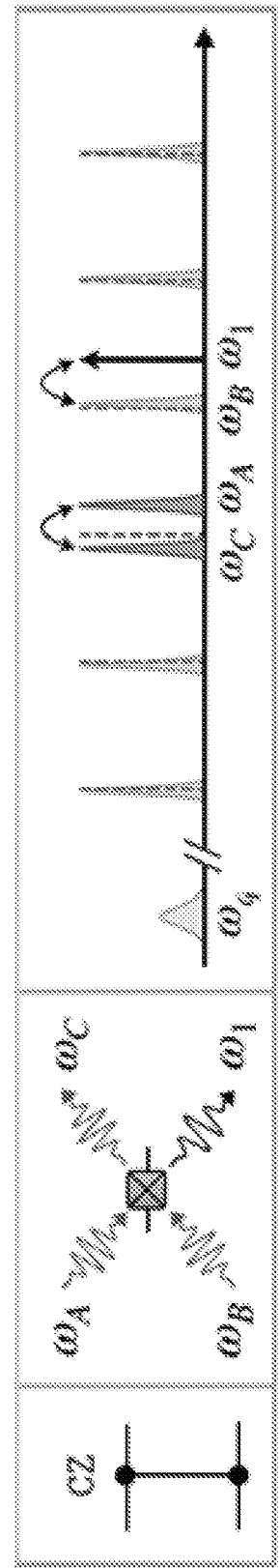

For example, phonons can be converted from frequency $\omega_A$ to $\omega_B$ by simultaneously applying drive tones with frequencies $\omega_1$ and $\omega_2$ that satisfy the resonance condition $\omega_2 - \omega_1 = \omega_B - \omega_A$. This four-wave mixing in effect may create a SWAP gate as shown in FIGS. 7B and 7C. The SWAP gate is performed with two of the phonon modes that have the right difference in frequency to obey the resonance condition. As noted above, there is an advantage in having a non-uniformity in the frequency spacing of the modes of the bosonic system. FIGS. 7B and 7C are therefore an example of this advantage—if the modes were evenly spaced in frequency space, the SWAP gate would not act on only one pair of modes, but instead many pairs of modes. The dashed vertical lines in FIGS. 7B and 7C are evenly spaced to highlight the non-uniformity of the frequency spacing of the modes shown in FIGS. 7B and 7C.

Driving the transmon qubit 710 with the drive tones with frequencies $\omega_1$ and $\omega_2$ that satisfy the resonance condition $\omega_2 - \omega_1 = \omega_B - \omega_A$ gives rise to an effective Hamiltonian:

$$H = g_v^{(1)} m_A m_B^\dagger + H.c.$$

with $$g_v^{(1)} = -2\alpha \frac{g_A}{\delta_A} \frac{g_B^*}{\delta_B} \frac{\Omega_1^*}{\delta_1} \frac{\Omega_2}{\delta_2}(1-\beta^{(1)})$$

Here, $\delta_j \equiv \omega_j - \omega_q$ and $\beta^{(1)}$ is a drive-dependent correction. Evolution under this coupling for a time $\pi/2g_v^{(1)}$ implements a SWAP gate, exchanging the states of modes $m_A$ and $m_B$, while evolution for a time $\pi/4g_v^{(1)}$ implements a 50:50 beamsplitter operation.

Three-mode interactions can also be engineered in QRAM system 701 as follows. Applying a single drive tone with frequency $\omega_1 = \omega_A + \omega_B - \omega_C$ gives rise to the effective Hamiltonian:

$$H = g_v^{(2)} m_A m_B m_C^\dagger + H.c.$$

with $$g_v^{(2)} = -2\alpha \frac{g_A}{\delta_A} \frac{g_B}{\delta_B} \frac{g_C^*}{\delta_C} \frac{\Omega_1^*}{\delta_1}(1-\beta^{(2)})$$

This three-mode interaction can be exploited to implement a controlled phase (CZ) gate for qubits encoded in the $|0,1\rangle$ phonon Fock states. To perform a CZ gate between qubits in modes A and B, mode C is used as an ancilla and initialized in $|0\rangle$. Evolving the states for a time $\pi/g_v^{(2)}$ then enacts the mapping $|110\rangle_{ABC} \to |001\rangle \to -|110\rangle$, while leaving other initial states unaffected. The state $|11\rangle_{AB}$ acquires a relative geometric phase, thereby implementing the CZ gate, as shown in FIG. 7C.

Furthermore, in QRAM system 701 a phase shift can be imparted as desired by tuning the drive phases during SWAP operations.

In view of the above, it may be noted that the SWAP, CZ, beamsplitter and phase shift operations that may be performed in the QRAM system 701 may thereby be applied to perform any of the gates shown and discussed in FIGS. 4A-4C, and thereby applied to implement the addressing and quantum routing discussed above in relation to FIGS. 2, 3 and 5.

Figure 8A:
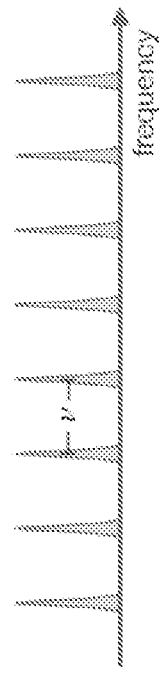
FIGS. 8A-8D illustrate techniques by which a suitable non-uniformity may be introduced into the frequency spacing of modes of a phonon system, according to some embodiments

FIGS. 8A-8D illustrate techniques by which a suitable non-uniform frequency spacing may be introduced into modes of a phonon system, according to some embodiments. FIG. 8A illustrates a uniform mode spacing for purposes of illustration; in FIG. 8A, each of the illustrated modes is separated from the neighboring modes by the same frequency gap.

Figure 8B:
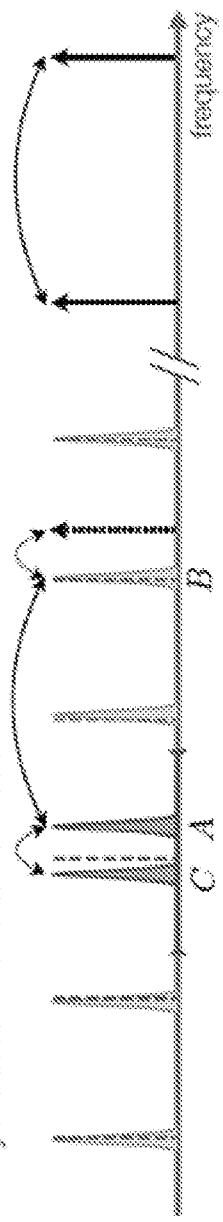

FIG. 8B illustrates phonon modes of a system that comprises a uniform phonon system coupled to an external mode, such as a microwave resonator. The resulting mode hybridization can significantly shift phonon mode frequencies within some bandwidth of the external mode. This class of non-uniform frequency spacing can enable selective two-mode coupling if one or both modes lie in the bandwidth, and selected three-mode coupling if two of the three involved modes lie in the bandwidth. In the example of FIG. 8B, the modes labeled A and C are strongly hybridized modes, which deviate from the otherwise uniform spacing. Modes A and B can be coupled by applying drives indicated by the vertical solid arrows on the rights, whereas modes A, B, and C can be coupled by applying the drive indicated by the vertical dashed arrow.

Figure 8C:
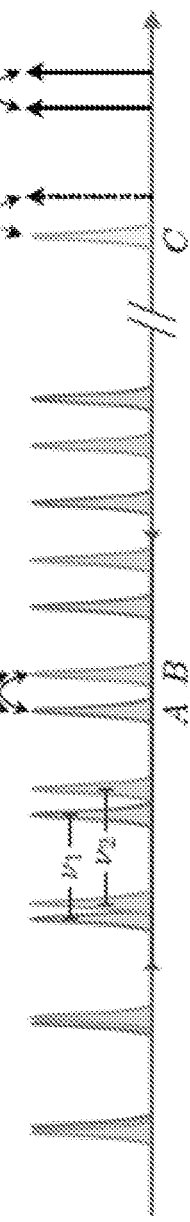

FIG. 8C illustrates phonon modes of a system that comprises two families of phonon modes with different free spectral ranges (FSRs). While modes within each family are evenly spaced, the FSR difference causes the spacing between the modes from different families to vary, as shown in FIG. 8C. This non-uniform frequency spacing enables two modes from different families to be selectively coupled, but because of the periodicity, selectivity is only guaranteed over a finite bandwidth smaller than one period. With two mode families, a set $\mathcal{S}$ containing $\approx \nu/\Delta\nu$ modes can be found wherein any two modes from different families can be selectively coupled with $\Delta\nu = |\nu_1 - \nu_2|$, where $\nu_{1,2}$ are the FSRs of the two families.

Having said that, the three-mode coupling may not be enabled by the two mode families without coupling to one or more external modes. Examples of such couplings include housing a BAW resonator inside a microwave cavity, and coupling a SAW resonator to a second SAW resonator or a microwave resonator. In some cases, a superconducting circuit coupled to the phonon system may serve as such an external mode, but gate fidelities may be limited by the coherence of the superconducting circuit.

Figure 8D:
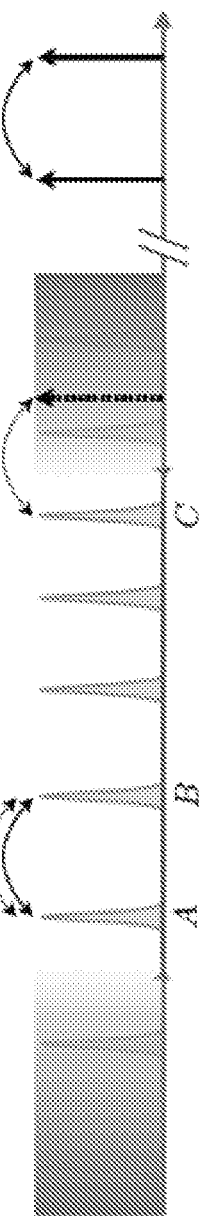

FIG. 8D illustrates phonon modes of a system that employs a composite acoustic resonator, in which phonons propagate in media with different indices of refraction. Reflections at the interface can give rise to a periodic modulation of the FSR. As with two mode families described above in relation to FIG. 8C, periodic non-uniformity of the frequency spacing can enable selective two-mode coupling within a finite bandwidth $\mathcal{S}$. Whether selective three-mode coupling within $S$ is feasible depends on the of the specific nature of the FSR modulation. In cases where it is not already possible, selective three-mode coupling can be enabled by either coupling the transmon to some external mode, as previously described, or alternatively by restricting the bandwidth over which the transmon-phonon coupling is appreciable.

For example, if the transmon-phonon coupling is only appreciable within $S$, as in shown in FIG. 8D, then selective three-mode coupling is possible since the system contains an effectively finite number of non-uniformly spaced modes. In SAW systems, the coupling bandwidth can be tuned by changing the number of fingers in the interdigitated transducer. In BAW systems, the coupling bandwidth can be similarly tuned by changing the electromechanical transducer's geometry. For instance, in a transducer comprised of alternating layers of piezoelectric and non-piezoelectric materials, the spacing, thickness, and number of such layers may be chosen so that the coupling has a narrow response centered at a particular frequency, as in a Bragg reflector.

Figure 9:
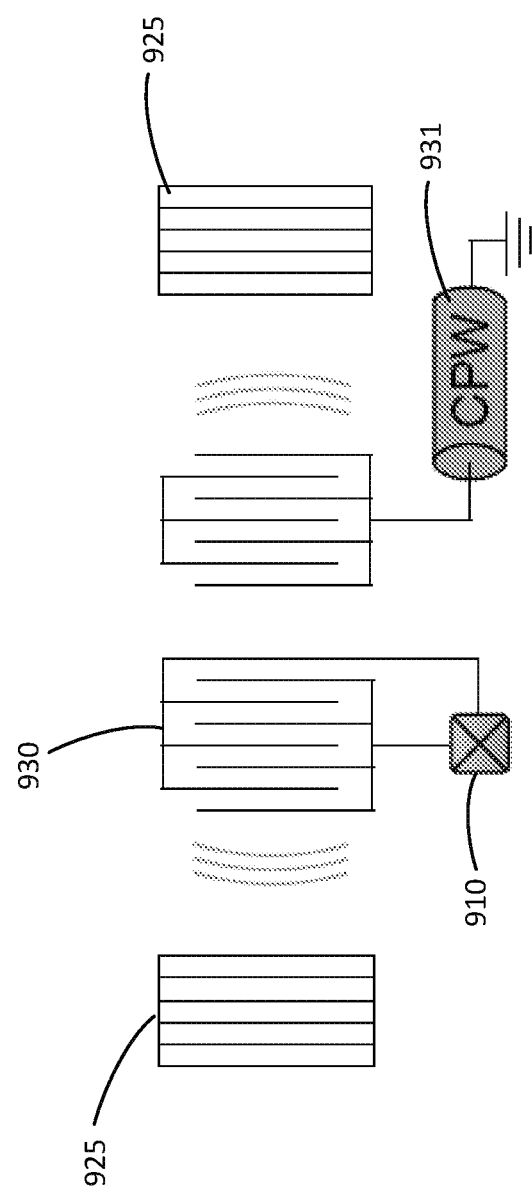
FIG. 9 depicts a SAW device that exploits an external mode hybridization strategy to produce non-uniformity in the frequency spacing of phonon modes, according to some embodiments.

For purposes of further illustration, FIG. 9 depicts a SAW device that exploits the external mode hybridization strategy discussed above in relation to FIG. 8B. A SAW resonator 925 is fabricated on a piezoelectric substrate, and coupling between a transmon 910 and the phononic modes of the SAW resonator is enabled by an interdigitated capacitor 930. A superconducting coplanar waveguide resonator 931 is also coupled to the phononic modes, and the hybridization of the phononic modes with the resonator mode creates the necessary non-uniformity in the frequency spacing of the modes.

FIGS. 10A-10C depict top, side and perspective views, respectively, of a BAW resonator that exploits the two mode families strategy discussed above in relation to FIG. 8C. In resonator 1000, a three-dimensional transmon 1015 is housed inside a microwave cavity and thin disks of a piezoelectric material (transducers) 1010 and 1011 fabricated on (or in) the transmon's pads 1005 and 1006, respectively, enable the transmon to couple to BAW modes in the substrate 1020. The two transducers couple the transmon simultaneously to two families of modes, which have different FSRs because the thickness of the substrate 1020 has been engineered to be different beneath each of the two transducers, as can be seen in the side view of FIG. 10B. The different modes, with independent mode spacing, can be seen in the perspective view of FIG. 10C, in which each of the two modes are shown in a different shading in frequency space.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, some aspects of the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of accessing a memory using a quantum address by operating a quantum router, the quantum router comprising a superconducting circuit coupled to a bosonic system, the bosonic system exhibiting non-uniformity in a frequency spacing of at least some modes of the bosonic system, the method comprising:
    initializing a plurality of address qubits with values based on the quantum address, wherein each of the plurality of address qubits is represented by a respective mode of the bosonic system;
    initializing a plurality of register qubits, wherein each of the plurality of register qubits is represented by a respective mode of the bosonic system;
    performing a plurality of quantum gates by providing energy to the superconducting circuit, each quantum gate changing a state of at least one of the plurality of register qubits based at least in part on a state of one of the plurality of address qubits; and
    performing, by providing energy to the superconducting circuit, a phase shift of one or more of the plurality of register qubits according to values stored in the memory.

2. The method of claim 1, wherein the memory is a classical memory storing a plurality of bits.

3. The method of claim 2, further comprising, for each bit of the plurality of bits stored in the memory, determining, based on a value of the bit, whether or not to perform a phase shift of a register qubit associated with the bit.

4. The method of claim 1, further comprising performing a second plurality of quantum gates subsequent to performing the phase shift of the one or more of the plurality of register qubits, the second plurality of quantum gates being based on states of one or more of the plurality of phase-shifted register qubits.

5. The method of claim 1, wherein initializing a plurality of register qubits comprises initializing one of the plurality of register qubits with a bus value, and initializing a remainder of the plurality of register qubits to a same state as one another.

6. The method of claim 1, wherein performing each quantum gate of the plurality of quantum gates comprises driving the superconducting circuit with two or more drives of different frequencies selected based on frequencies of modes of the bosonic system.

7. The method of claim 1, wherein performing the plurality of quantum gates by providing energy to the superconducting circuit comprises performing a plurality of SWAP gates.

8. The method of claim 1, wherein performing the plurality of quantum gates by providing energy to the superconducting circuit comprises performing a plurality of CZ gates.

9. The method of claim 1, wherein performing the plurality of quantum gates by providing energy to the superconducting circuit comprises performing one or more of the plurality of quantum gates in a series of time steps, wherein a number of time steps in the series of time steps is of order $\log_2(N)$, wherein N is a number of bits stored by the memory.

10. The method of claim 1, wherein the bosonic system comprises a crystal resonator.

11. The method of claim 1, wherein the memory is a quantum memory storing a plurality of qubits.

12. A quantum random access memory (QRAM) system, comprising:
    a memory;
    a quantum router comprising:
        a superconducting circuit comprising at least one non-linear element; and
        a bosonic system coupled to the superconducting circuit, the bosonic system exhibiting non-uniformity in a frequency spacing of at least some modes of the bosonic system; and
    at least one controller configured to manipulate states of modes of the bosonic system by applying energy to the superconducting circuit based on a quantum address representing a superposition of address locations within the memory.

13. The QRAM system of claim 12, wherein the bosonic system comprises a crystal resonator.

14. The QRAM system of claim 13, wherein the crystal resonator is a bulk acoustic wave (BAW) resonator or a surface acoustic wave (SAW) resonator.

15. The QRAM system of claim 12, wherein the superconducting circuit comprises a transmon qubit.

16. The QRAM system of claim 12, further comprising a transducer coupling the superconducting circuit to the bosonic system.

17. The QRAM system of claim 16, wherein the transducer comprises piezoelectric material.

18. The QRAM system of claim 12, wherein the at least one controller is configured to:
    initialize a plurality of address qubits with values based on the quantum address, wherein each of the plurality of address qubits is represented by a respective mode of the bosonic system;
    initialize a plurality of register qubits, wherein each of the plurality of register qubits is represented by a respective mode of the bosonic system; and
    perform a plurality of quantum gates by providing energy to the superconducting circuit, each quantum gate changing a state of at least one of the plurality of register qubits based at least in part on a state of one of the plurality of address qubits.

19. The QRAM system of claim 18, wherein performing each quantum gate of the plurality of quantum gates comprises driving the superconducting circuit with two drives of different frequencies selected based on frequencies of modes of the bosonic system.

20. The QRAM system of claim 12, wherein the memory is a quantum memory storing a plurality of qubits.

21. The QRAM system of claim 12, wherein the memory is a classical memory storing a plurality of bits.

* * * * *